Aug. 1, 1933.  G. A. LYON  1,920,575
WHEEL RIM ORNAMENTAL BEAD
Filed July 28, 1932
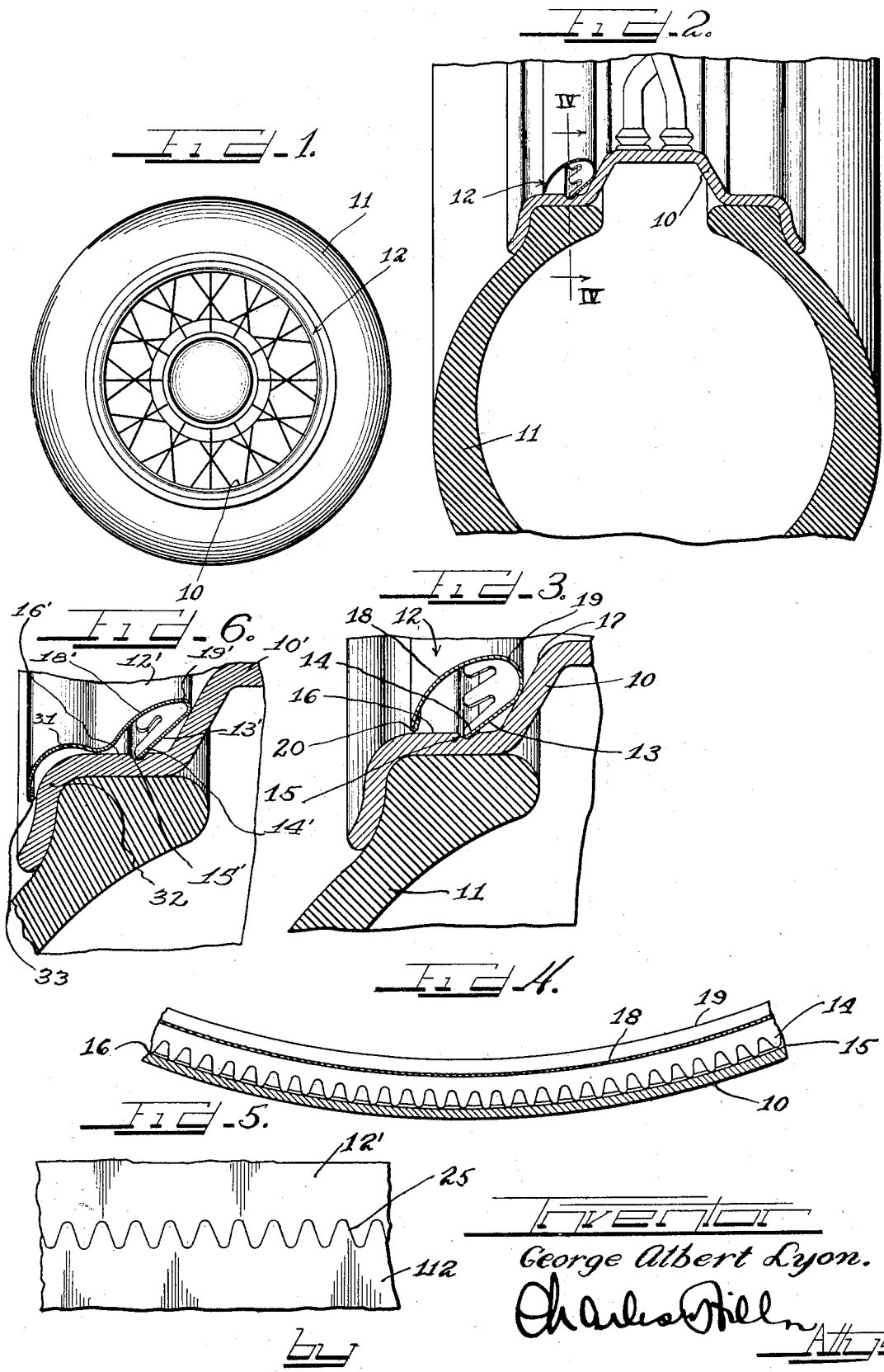

Patented Aug. 1, 1933

1,920,575

UNITED STATES PATENT OFFICE 1,920,575

WHEEL RIM ORNAMENTAL BEAD

George Albert Lyon, Allenhurst, N. J.

Application July 28, 1932. Serial No. 625,307

6 Claims. (Cl. 41—10)

This invention relates to circular ornamental beading and more particularly to an ornamental beading especially adapted to be used with wheel rims.

It is an object of this invention to provide a circular ornamental beading including a underturned portion flexible into a circular groove in an article and an outer marginal portion for concealing the underturned portion and having its inner edge so arranged as to be spaced from the article and to thus not interfere with the free movement of the underturned portion into engagement with the circular groove.

Another object of the invention is to provide a circular ornamental bead adapted to be flexed into engagement with a groove in a wheel rim and so formed as to afford a minimum amount of resistance to the flexing of the bead into engagement with the groove.

Other objects and advantages of the invention will fully appear from the following detail description taken in connection with the accompanying drawing which illustrates a single embodiment thereof and in which Figure 1 is a side view of an automobile tire and wheel showing my novel circular beading applied to the wheel rim, Figure 2 is a transverse cross sectional view taken through a portion of Figure 1 and drawn to an enlarged scale illustrating the cross sectional shape of my ornamental bead and the manner in which it cooperates with the wheel rim;

Figure 3 is an enlarged view of the beading as shown in Figure 2 and showing more clearly the characteristics of the beading and its cooperation with the wheel rim;

Figure 4 is a fragmentary sectional view taken on substantially the line IV—IV of Figure 2 looking in the direction indicated by the arrow and illustrating in detail the shape of the resilient fingers on the bead for holding the bead in position;

Figure 5 is a fragmentary plan view of a portion of a metallic sheet or strip showing the manner in which the rings may be initially blanked from such sheet or strip with the fingers of one ring interlocked with those of another ring so as to effect a saving in the cost of material going into the manufacture of the ring;

Figure 6 is a view similar to Figure 3 showing a modification of the invention.

The reference character 10 designates generally a wheel rim on which is suitably carried a tire 11. This wheel rim has applied to it my novel ornamental beading 12 which is circular in form and is adapted to be retained in engagement with the rim solely by its contact therewith.

The wheel rim 12 as best shown in Figure 3 has an underturned portion 13 the inner edge of which is composed of a plurality of spaced resilient teeth 14 (Figure 4) adapted to be resiliently flexed into engagement with a circular groove 15 formed in the flat inner surface 16 of the wheel rim 10. It is of course to be appreciated that the wheel rim 10 with the exception of the circular groove 15 may be of any conventional construction and may be made of any suitable material.

The underturned portion 13 of the bead 12 extends obliquely from the flat wheel rim inner surface 16 towards the inclined wheel rim surface 17 and makes contact with the same as best shown in Figure 3.

The bead 12 also includes an outer portion 18 which is curved at 19 so as to have one of its marginal portions formed into the underturned portion 13 previously described. The free edge of the convexly and transversely curved outer portion 18 terminates in an edge 20 which is slightly spaced from the flat wheel rim surface 16 so as not to interfere with the flexing of the fingers 14 into engagement with the circular groove 15.

It will of course be appreciated that the circular ornamental bead 12 may be in the form of a continuous circle or may comprise a split ring or it may be made up of a number of arcuate sections suitably joined together.

In the application of the bead to the rim, the bead is shoved into a position in which it is concentric with the rim and its fingers are caused to slide over the surface 16 of the rim until such fingers are snapped into the circular groove 15. During this operation of flexing the ring into proper position on the wheel rim, it will of course be appreciated that, in view of the fact that the edge 20 of the bead is entirely free of the surface of the rim, it follows that the flexing of the fingers 14 is not in any way hampered or interfered with by frictional contact of other portions of the bead with the rim. This feature is highly desirable since it greatly facilitates the application or removal of the bead to and from the wheel rim.

In Figure 5 I have illustrated somewhat diagrammatically the manner in which the ring may be formed from sheet material such as metallic sheets in such a way that the fingers of one ring under construction may be interfitted with the fingers of another ring being fabricated at the same time so that there is no waste of material incident to the forming of the fingers. The interfitted fingers are designated by the reference character 25 and the two bead strips under construction shown in Figure 5 are designated by the reference numerals 12' and 112.

Any suitable process may be used in the fabrication and manufacture of the ring to provide it with the structural features and characteristics hereinabove described.

In Figure 6 I have illustrated a modification of the invention in which the bead 12' like bead 12 has an underturned portion 13' with teeth 14' engaging in a groove 15' in the surface 16' of the rim 10'. The underturned portion 13' is connected by a curved portion 19' to an outer convex portion 18'. This outer convex portion 18' has a curved lateral extension 31 which extends circumferentially outwardly and over the curved edge portion 32 of rim 10 and terminates in a turned edge 33, this turned edge being slightly spaced from the rim portion 32.

The operation of this form of the invention is substantially like that of the other form except that it covers more of the rim than the other form.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. The combination with a wheel rim having a circular groove therein of an ornamental circular bead disposed over said groove so as to overlie the same and having an underturned portion in engagement with said groove and an outer curved marginal portion the edge of which is slightly spaced from the rim so as not to offer any resistance to the free movement of said under turned portion into engagement with the groove.

2. The combination with a wheel rim having a circular groove therein of an ornamental circular bead disposed over said groove so as to overlie the same and having an underturned portion in engagement with said groove and an outer marginal portion the edge of which is slightly spaced from the wheel rim so as not to interfere with the free movement of said underturned portion into engagement with said groove, said underturned portion including a plurality of spaced resilient means adapted to be flexed into said groove to hold the bead on the rim with said outer marginal edge portion slightly spaced from the adjoining surface of the rim.

3. The combination with a wheel rim of an ornamental bead therefor of curved cross section and having tight cooperation with the rim solely by its engagement with the rim, said bead including a normally concealed marginal portion for resiliently engaging said rim and an outer marginal portion having its edge slightly spaced from the rim so as not to interfere with the flexing of said concealed marginal portion into engagement with the rim.

4. The combination with a wheel rim of an ornamental bead therefor of curved transverse cross section and held in tight cooperation with the rim solely by its engagement with the rim, said bead including a normally concealed portion for resiliently engaging said rim and comprising a plurality of spaced flexible teeth normally concealed by an outer portion, the edge of which is maintained out of engagement with the rim so as not to interfere with the flexing of the teeth into engagement with the rim.

5. The combination with a wheel rim of an ornamental bead therefor of curved transverse cross section and held in tight cooperation with the rim solely by its engagement with the rim, said bead including a normally concealed marginal portion for resiliently engaging said rim and comprising a plurality of spaced flexible teeth adapted for engagement in a circular groove in the rim and normally concealed by an outer marginal portion an edge of which is slightly spaced from the rim so as not to render the teeth visible but to, at the same time, not interfere with the free flexing of the teeth into engagement with said circular groove.

6. The combination with an article having a circular groove therein, of an ornamental circular bead disposed over said groove so as to overlie the same and having an underturned portion in engagement with the groove and an outer marginal portion for concealing said underturned portion and having its edge formed to be spaced from said article so as not to interfere with the moving of said underturned portion into engagement with said groove.

GEORGE ALBERT LYON.